United States Patent [19]

Seib et al.

[11] Patent Number: 4,973,447

[45] Date of Patent: Nov. 27, 1990

[54] FREEZE-THAW STABLE MODIFIED WAXY BARLEY STARCH

[75] Inventors: Paul A. Seib, Manhattan, Kans.; Yangsheng Wu, Lafayette, Ind.

[73] Assignee: Kansas State University Research Foundation, Manhattan, Kans.

[21] Appl. No.: 487,205

[22] Filed: Mar. 1, 1990

[51] Int. Cl.⁵ ............................................. A23L 1/0522
[52] U.S. Cl. ..................... 426/549; 426/556; 426/578; 426/579; 426/589; 426/583; 426/658; 127/33; 127/70; 536/106; 536/111; 106/210
[58] Field of Search .............. 426/658, 578, 579, 589, 426/573, 556, 549; 127/33, 70; 536/106, 111; 106/210

[56] References Cited

U.S. PATENT DOCUMENTS

| | | | |
|---|---|---|---|
| 2,653,876 | 9/1953 | Hanson et al. | 426/578 |
| 2,853,484 | 9/1958 | Lolkema et al. | 260/233.3 |
| 2,884,413 | 4/1959 | Kerr | 260/233.3 |
| 2,900,268 | 8/1959 | Rankin et al. | 106/210 |
| 2,935,510 | 5/1960 | Wurzburg | 260/233.3 |
| 3,278,522 | 10/1966 | Murray et al. | 260/233.3 |
| 3,369,910 | 2/1968 | Ganz | 426/478 |
| 3,437,493 | 4/1969 | Robinson | 426/478 |
| 3,719,661 | 3/1973 | Robinson | 260/233.3 R |
| 3,751,410 | 8/1973 | Caracci et al. | 260/233.3 |
| 3,876,629 | 4/1975 | Lotzgesell | 260/233.3 |
| 3,951,947 | 4/1976 | Schanefelt | 260/233.3 |
| 4,428,972 | 1/1984 | Wurzburg | 426/578 |
| 4,452,978 | 6/1984 | Eastman | 536/111 |
| 4,562,086 | 12/1985 | Smolka | 426/578 |
| 4,623,549 | 11/1986 | Katt et al. | 426/579 |
| 4,690,829 | 9/1987 | Usui | 426/661 |
| 4,790,997 | 12/1988 | Friedman | 426/578 |
| 4,801,470 | 1/1989 | Friedman | 426/578 |
| 4,847,371 | 7/1989 | Schara | 426/579 |

*Primary Examiner*—Jeanette Hunter
*Attorney, Agent, or Firm*—Hovey, Williams, Timmons & Collins

[57] ABSTRACT

Improved dual modified waxy barley starch products are provided which exhibit excellent freeze-thaw stability and other properties making the starches eminently suited for incorporation into food products such as pie fillings or the like. Separated waxy barley starch is subjected to sequential hydroxypropylation (at a level to provide at least about thre percent by weight hydroxypropyl groups) and cross-linking (phosphorus oxychloride or sodium trimetaphosphate) to provide the products of the invention.

10 Claims, 2 Drawing Sheets

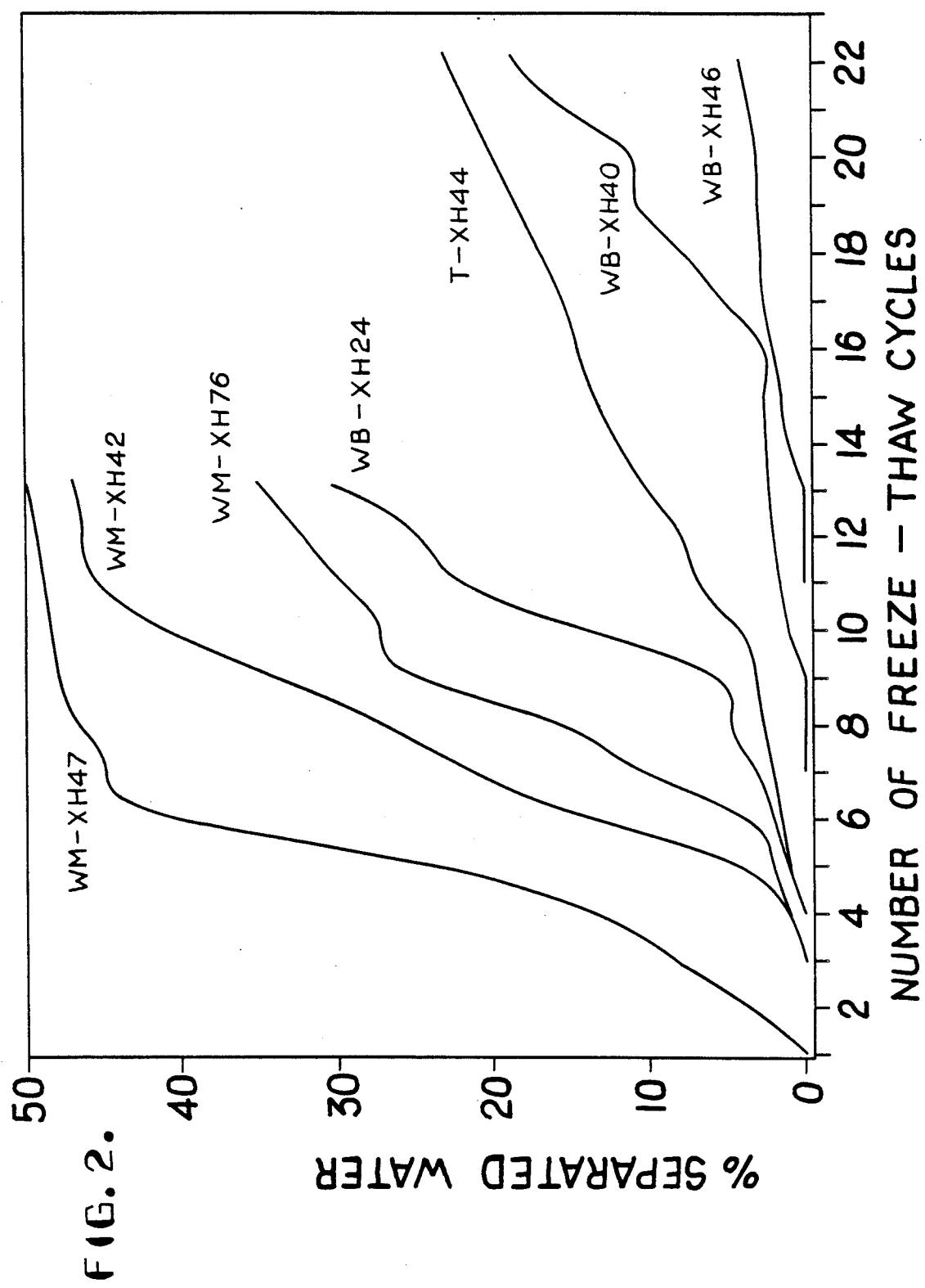

FREEZE-THAW STABLE MODIFIED WAXY BARLEY STARCH

BACKGROUND OF THE INVENTION

1. Field of the Invention

The present invention is broadly concerned with doubly modified waxy barley starch products exhibiting extraordinary freeze-thaw stability together with good thickening power, clarity and paste stability making the starch products particularly useful in the context of food systems (e.g., pie fillings) typically subject to freeze-thaw cycles. More particularly, it is concerned with such waxy barley starch products, together with resultant food systems containing the same, wherein waxy barley starch is both cross-linked and hydroxypropylated to achieve the outstanding freeze-thaw stability characteristics of the invention.

2. Description of the Prior Art

Barley (*Hordeum vulgare L.*) is the world's fourth most important cereal crop, after wheat, maize, and rice. Roughly, its production is two-fifths that of wheat. It is grown over a broader environmental range than any other cereal. Much of the world's barley is produced in regions with climates unfavorable for growing other major cereals. During the past two decades, the harvested area of barley in the world has increased faster than those of rice, although not as rapidly as those of wheat or maize.

Barley has two principal commercial uses. One is for livestock feed and the other is for malting. The use of barley for human food is mainly found in regions where other cereals do not grow well due to altitude, latitude, low rainfall, or soil salinity. In the U.S.A., approximately 2% of the barley production is used for food products. In Western Europe, barley has also been used for industrial starch production.

In the early 1970's, waxy Compana barley was developed at Montana State University based on the generalization that waxy starch is superior to normal starch for many food uses. The source of the waxy gene in the Montana State barley-breeding program was waxy Oderbrucker. Compana was chosen as a parent cultivar because of its large kernel size and high yield; it is a two-rowed spring barley grown in Montana for many years as a feed barley. It has also been suggested that a waxy barley variety with good agronomic properties would provide a new source of raw material for the production of waxy starch. In recent years, it has been pointed out that the beta-glucans in waxy barley would be a valuable source of dietary fiber since they may reduce serum cholesterol.

Starches are added to processed foods primarily as functional ingredients. They provide the characteristic viscosity, texture, and stability to many food products. The highly viscous paste of waxy maize starch has led to its extensive use as an unmodified starch and a base for making a broad line of modified starches for thickening and texturizing foods, as well as for industrial application.

It is known that cooked pastes of normal-amylose starches at 6-15% starch solids set to a stiff gel when cooled; while under the same conditions, non- or low-amylose waxy starches form a viscous sol. It is believed that this characteristic difference accounts for the lack of utility of waxy starches in certain food systems.

For example, normal barley starch can be substituted for wheat starch in bread making. However, when wheat starch in bread was replaced with low amylose waxy barley starch, the microloaf collapsed upon cooling, or the pup-loaf shrank excessively. The collapse or shrinkage of the cooled bread indicates that the viscous sol of the cooked waxy barley starch was too deformable to support the loaf and that denatured gluten does not perform that function alone.

SUMMARY OF THE INVENTION

It has now been discovered that waxy barley starch, when appropriately modified by hydroxypropylation and cross-linking, exhibits properties making it extremely useful as a starch additive in food products such as pie and pastry fillings, puddings, custards and yogurts. The doubly modified waxy barley starch products of the invention exhibit significantly enhanced freeze-thaw stability, while at the same time giving good thickening power, clarity and paste stability.

Broadly speaking, waxy barley starch having a total amylose content of less than about ten percent by weight, and more preferably less than about six percent by weight, and most preferably less than about five percent by weight can be used in the invention. The average diameters of large and small starch granules of waxy barley starch are from about 10-25 $\mu$m and 2-6 $\mu$m, respectively. The waxy barley starch moreover contains less than about 0.5% by weight protein, and more preferably from about 0.2 to about 0.3% by weight protein.

The waxy barley starch is doubly modified to obtain the desirable results of the invention. Such modification involves both hydroxypropylation and cross-linking. Preferably, the dual modification is carried out sequentially, first hydroxypropylation and then cross-linking. Hydroxypropylation is advantageously carried out by reacting the starch with propylene oxide, whereas cross-linking preferably involves reaction with phosphorus oxychloride or sodium trimetaphosphate. In the case of hydroxypropylation, the starch should exhibit at least about three percent by weight hydroxypropyl groups therein, and more preferably at least about four percent by weight thereof; while the $POCl_3$ agent should be present at a level of from about 0.003 to 0.050% by weight, and more preferably at a level of from about 0.005 to 0.007% by weight.

Pastes of the modified starches in accordance with the invention are extremely resistant to freeze-thaw deterioration. Indeed, such starches normally exhibit less than ten percent water separation when subjected to at least eight successive starch paste freeze-thaw cycles, and preferred starches of the invention have this stability characteristic over many more freeze-thaw cycles. The exact reasons for the marked freeze-thaw stability of these modified waxy barley starches are unknown. Cross-linking is known to substantially reduce freeze-stability of starch pastes (T. J. Schoch in "The Freezing Preservation of Foods" Volume 4, D. K. Tressler, V. B van Arsdel, and M. J. Copley, eds., Avi Publishing Co., Westport, CT, pp 45-56). The unusual stability must be attributed to the distribution of hydroxypropyl groups on the starch molecular and/or to the structure of the molecules in the native starch.

The dual modified starches find particular untility in food products designed for freezing and subject to multiple freeze-thaw cycles. Broadly, such food products include therein respective quantities of protein, water, and sweetening and/or flavoring agents (e.g., sugar).

Use of the modified waxy barley starches of the invention yields excellent organoleptic properties while greatly increasing the freeze-thaw stability thereof. Representative food products would include pie and pastry fillings, custards, puddings, yogurts, salad dressings, pasta-type products (e.g., noodles) and baked goods.

BRIEF DESCRIPTION OF THE DRAWINGS

FIG. 2 is a graphical representation of another comparative freeze-thaw cycle study which demonstrates the superior freeze-thaw stability of doubly modified waxy barley starches in accordance with the invention.

DESCRIPTION OF THE PREFERRED EMBODIMENTS

Figure 1:
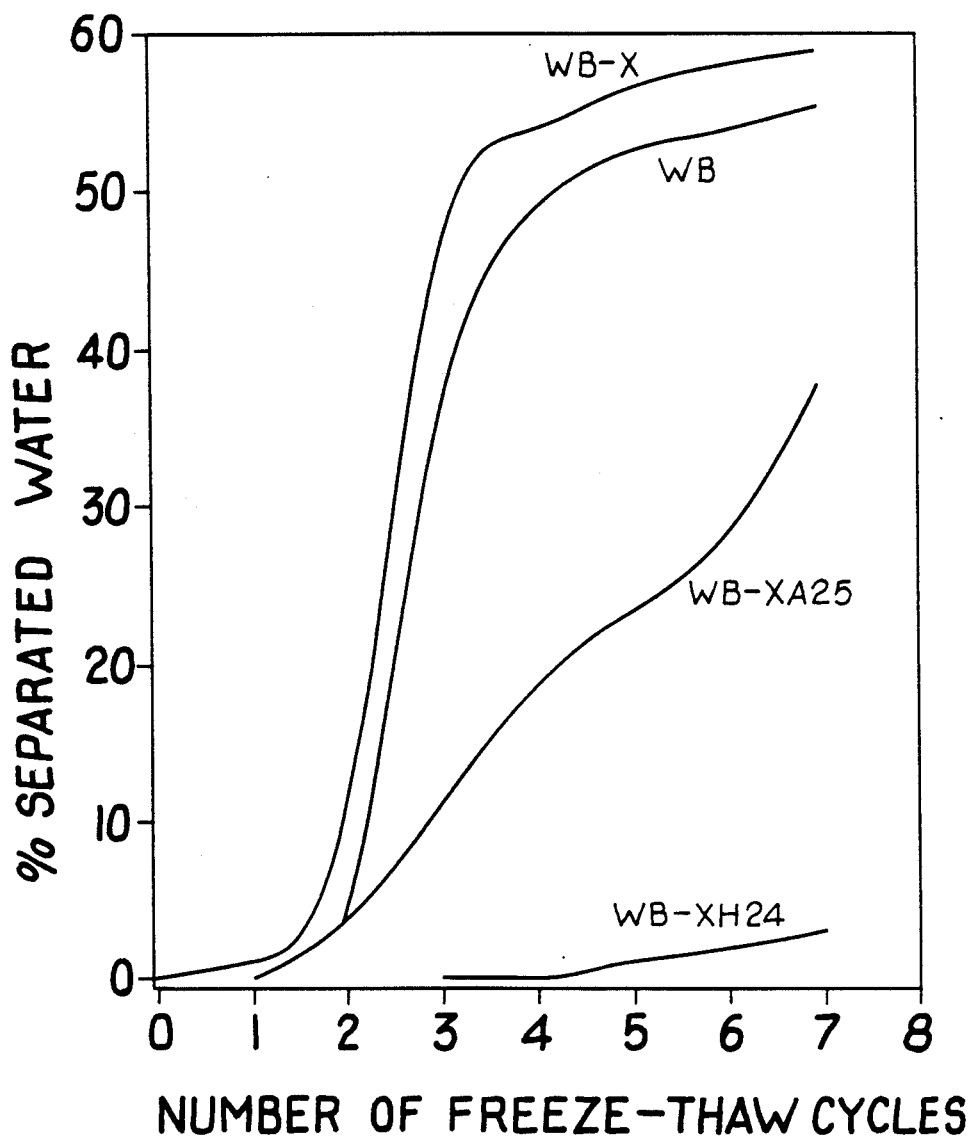
FIG. 1 is a graphical representation of a freeze-thaw cycle study undertaken to compare the freeze-thaw stability of starch products in accordance with the present invention, versus other waxy barley starches.

The preferred techniques for isolation, dual modification, and testing of waxy barley starch are set forth below. It should be understood that these preferred methods are set forth for purposes of illustration only, and nothing therein should be construed as a limitation upon the overall scope of the invention.

Isolation of Starch

The process of starch isolation and purification was a modification of the method used by Goering and co-workers (Goering et al., Cereal *Chem.* 47:592 (1970), Goering and Imsande, *J. Agric. Food Chem.* 8:368 (1960)), these articles being incorporated by reference herein. Pearled single mutant waxy barley (500 g.) was steeped in 1000 ml. water containing 0.2% sodium metabisulfite at room temperature. After 24 hours, the steeping water was decanted, the barley kernels were ground in a Waring blender, and the resultant slurry screened through a 10XX (132 $\mu$m) nylon bolting cloth. The residue was reground in the blender with water, the mixture screened, and the process repeated several more times. The combined starch slurry was then centrifuged in 250-ml bottles at 1,000$\times$g for 5 min, the liquid decanted, and the pigmented fraction (tailings) atop the starch carefully scraped away. The crude starch was then suspended in cold 0.15% NaOH, centrifuged 5 min at 1,000$\times$g, and the supernatant and tailings removed. The alkaliwashing step was repeated 3 times, at which point the tailings appeared negligible. The starch was washed with H$_2$O (2L) to remove excess alkali, screened through 16XX (73 $\mu$m) bolting cloth, neutralized with 1N HCl, washed with distilled water, and dried in a convection oven at 40° C. to give approximately 200 g of starch.

Starch Modification

Dual modification of the isolated waxy barley starch was done by first reacting the starch with propylene oxide according to the methods described in U.S. Pat. Nos. 2,516,633 and 3,422,088, both of which are incorporated by reference herein. The etherification reaction with propylene oxide was conducted in a 1-liter pressure reactor (Parr Instrument Co., Moline, IL) equipped with a stirring mechanism and a temperature/process controller. A 35% aqueous suspension of isolated waxy barley starch (100 g.) containing one percent NaOH and 15% Na$_2$SO$_4$ (both based on dry weight of starch) was transferred into the pressure reactor, and the liquid propylene oxide (ten percent based on dry weight of starch) was added thereto. The temperature was raised to 45° C., at which point gauge pressure was 28 psi, and the mixture was transferred to a beaker. The pH of the slurry was still 11.6 (the same as before the hydroxypropylation reaction). Cross-linking was then completed by addition of 7 mg. of POCl$_3$ using a microliter syringe. After stirring for one more hour, the reaction mixture was adjusted to pH 5.5 with 1N HCl, and the starch was isolated by centrifugation, washed five times with water, and dried at 40° C. The resultant doubly modified waxy barley starch contained about 4.6% by weight hydroxypropyl groups therein. The level of hydroxypropyl groups was determined using the method of Johnson, *Analytical Chemistry*, 41:859 (1969).

Freeze-Thaw Stability

Starch pastes using the doubly modified waxy barley starches of the invention were tested for freeze-thaw stability according to the technique described by Schoch, *The Freezing Preservation of Foods*, Vol, 4, 4th Ed., p. 44–56 (1968), incorporated by reference herein. Respective pastes were prepared by suspending 6.25% starch (dry basis) in distilled water at pH 6.0, heating in the Amylograph to 95° C., holding at 95° C. for thirty minutes, and then stirring as the pastes cool from 95° C. to 50° C. After cooling to 25° C., the pastes were weighed (exactly 20 g. each) into 50 ml. polypropylene centrifuge tubes and covered tightly with tube closures. The tubes containing the starch pastes were then stored at 4° C. for twenty-four hours, and then subjected to a number of freeze-thaw cycles. In each cycle, the tubes were put in a freezer at −23° C. for twenty-two hours and then thawed at 30° C. in a water bath for two hours. After each cycle, three replicate tubes were centrifuged for fifteen minutes at 1500$\times$g, and the amount of liquid separated was determined by weight and averaged. Successive freeze-thaw cycles were then run on the remainder of the tubes.

Attention is next directed to FIGS. 1 and 2 which graphically illustrate the results of a series of comparative freeze-thaw studies. In FIG. 1, unmodified waxy barley starch (WB), cross-linked waxy barley starch (WB-X), acetylated, cross-linked modified waxy barley starch at a 2.5% substitution level (WB-XA25), and barley starch in accordance with the present invention, cross-linked with POCl$_3$ and hydroxypropylated at a substitution level of 2.4% (WB-XH24). As can be readily seen, the dual modified waxy barley starch of the invention exhibited significantly enhanced freeze-thaw stability as compared with the other starches tested.

FIG. 2 illustrates a comparative test of the starches of the present invention versus commercially available modified starches. The designations WM-XH47, WM-XH42 and WM-XH76 refer to commercial cross-linked and hydroxypropylated waxy maize starches having, respectively, 4.7%, 4.2% and 7.6% hydroxypropyl substitutions therein. The WB-XH24, WB-XH40 and WB-XH46 designations refer to starches pursuant to the present invention, each cross-linked with POCl$_3$ and having hydroxypropyl substitutions at 2.4%, 4.0% and 4.6%. Finally, the T-XH44 is a commercially available, dual modified tapioca starch having a 4.4% hydroxypropyl substitution. The most preferred starch product of this test, WB-XH46, unexpectedly gave a much better freeze-thaw stability than the commercial starches.

In this regard, the starch exhibited no significant water separation after 22 freeze-thaw cycles.

The WB-XH46 product was also tested for thickening power as compared with a similarly modified waxy maize starch; the pasting curves were very close between the two starch products. It was therefore concluded that the products of the invention are well suited for food applications.

A model paste system was devised to simulate an acidic fruit filling for a frozen pie or pastry. In the freeze-thaw tests with pastes made from 5% starch in 25% sucrose containing 0.01–0.02% malic acid (pH 3.5), none of the hydroxypropylated starches of the invention showed syneresis after 40 cycles (−23° C./30° C.). This same observation was made in freezer storage tests with pastes made from 5% starch in sucrose/acid solutions where no syneresis occurred in any of the hydroxypropylated starches after six months at −23° C. Because the presence of sugar hinders association of the starch molecules, more freeze-thaw cycles and longer storage time are needed to finally differentiate the best cold temperature stable starch in this simulated frozen pie-filling paste.

We claim:

1. A freeze-thaw stable, doubly modified waxy barley starch product which comprises waxy barley strach having a total amylose content of less than about 6% by weight which has been cross-linked and hydroxypropylated.

2. The doubly modified starch product of claim 1, said starch being hydroxypropylated to exhibit at least about 3% by weight hydroxypropyl groups in the doubly modified starch product.

3. The doubly modified starch product of claim 1, said starch being cross-linked with an agent selected from the group consisting of phosphorus oxychloride and sodium trimetaphosphate.

4. The doubly modified starch product of claim 3, said cross-linking agent being $POCl_3$ and being used at a level of from about 0.003 to 0.050% by weight to produce the doubly modified starch product.

5. The doubly modified starch product of claim 1, said product being characterized by the property of exhibiting less than 10% water separation when subjected to eight successive starch paste freeze-thaw cycles.

6. A food product designed for freezing and subject to a number of freeze-thaw cycles, said food product including therein respective quantities of protein, water and sweetening agent and having therein a doubly-modified waxy barley starch product to increase the freeze-thaw stability of the food product, said starch product comprising waxy barley starch having a total amylose content of less than about 6% by weight which is cross-linked and hydroxypropylated.

7. The food product of claim 5, said starch product being characterized by the property of exhibiting less than 10% water separation when subjected to eight successive starch paste freeze-thaw cycles.

8. The food product of claim 5, said mixture being selected from the group consisting of pie and pastry fillings, custards, puddings, yogurts, salad dressings, pasta-type products and baked goods.

9. The food product of claim 5, said starch product being hydroxypropylated to exhibit at least about 3% by weight hydroxypropyl groups in the doubly modified starch product.

10. The food product of claim 5, said cross-linking agent being used at a level of from about 0.003 to 0.050% by weight to produce the doubly modified starch product.

* * * * *